3,328,367
COPOLYMERS
Richard Watkin Rees, Graylyn Crest, Del., assignor to E.
I. du Pont de Nemours and Company, Wilmington, Del.,
a corporation of Delaware
No Drawing. Filed Apr. 29, 1965, Ser. No. 452,017
11 Claims. (Cl. 260—85.5)

This application is a continuation-in-part of application, Ser. No. 248,855, filed Jan. 2, 1963.

The present invention relates to novel copolymers linked with diamines.

It is an object of this invention to increase the tensile strength, tensile modulus, heat distortion temperature and hardness of certain vinyl type polymers which are more fully defined below.

These and other objects are accomplished by attaching acid groups to the base polymer and then reacting the acid groups with diamines to link the polymer. The acid groups may be attached to the polymer in a variety of ways. One way is by copolymerizing a portion of an $\alpha,\beta$-ethylenically unsaturated carboxylic acid monomer with the monomer of the base polymer, or by graft polymerizing an $\alpha,\beta$-ethylenically unsaturated carboxylic acid monomer on the base polymer, or by grafting acid groups on the base polymer, e.g., sulfonating polystyrene.

The polymer is reacted with diamines by milling, melt blending, slurrying the polymer with a solution of the diamine or by passing a fabricated article of the copolymer through a solution of the diamine.

The polymers useful in the present invention are addition polymers, and contain from 0.2 to 25 mole percent, based on the monomer units in the polymer, of acid groups. The preferred acid group containing monomers are the $\alpha,\beta$-unsaturated carboxylic acids containing from 3 to 10 carbon atoms and styrene sulfonic acid. Examples of such monomers are acrylic acid, methacrylic acid, ethacrylic acid, itaconic acid, maleic acid, fumaric acid, monoesters of the above dicarboxylic acids, such as methyl hydrogen fumarate, ethyl hydrogen fumarate, and maleic anhydride, mononitriles of the above dicarboxylic acids, such as $\beta$-cyano acrylic acid, and monoamides of the above dicarboxylic acids such as fumaric monoamide. In general, it is preferred that the alcohol or amine forming the respective ester or amide, be an alkyl alcohol or amine which alkyl group contains up to 10 carbon atoms. As indicated, the polymer contains from 0.2 to 25 mole percent of the carboxylic acid monomer, but preferably contains from 1 to 10 mole percent of the carboxylic acid monomer. The remainder of the copolymer, or the original polymer on which the carboxylic acid-group-containing monomers are grafted, consists essentially of vinyl monomeric units hereinafter referred to as the predominant monomer, which have the structure $CH_2=CHR_1$, wherein $R_1$ is selected from the group consisting of aromatic radicals, ester radicals, amide radicals, acyloxy radicals, alkoxy radicals, halogens, acyl radicals and nitriles, or monomeric units having the structure $$CH_2=C\begin{matrix}R_2\\|\\|\\R_3\end{matrix}$$

wherein $R_2$ is selected from the group consisting of halogens and methyl, and $R_3$ is selected from the group consisting of halogens, the phenyl radical, ester radicals, amide radicals, and nitriles. The copolymers can be readily obtained by graft polymerization of the acid comonomer to a polymer base of the major comonomer. Such graft copolymers are generally obtained by exposing a solution or finely divided powder of a polymer of the major comonomer to ionizing radiation in the presence of the carboxylic acid comonomer. In another method, the polymer of the major comonomer in solution or finely divided form is contacted with a solution of the acid and a peroxide. Graft polymerization has been described in great detail in the literature and is for that reason not further detailed here. Copolymers of the major constituent monomer with carboxylic acids are preferably prepared by copolymerization of the major constituent monomer with an $\alpha,\beta$-ethylenically unsaturated carboxylic acid which subsequently or during copolymerization is reacted either completely or in part to form the acid. Thus hydrolysis, saponification or pyrolysis may be employed to form an acid copolymer from an ester copolymer.

Other polymers useful in the present invention include polymers on which acid groups have been attached. Examples of such polymers include partially sulfonated polystyrene and partially carboxylated polystyrene. Similar polymers are produced by copolymerizing or graft polymerizing styrene with styrene sulfonic acid or styrene carboxylic acid. The styrene sulfonic acid/styrene copolymers preferably contain from 0.2 to 25 mole percent acid groups, based on the monomer units in the polymer, the same as the $\alpha,\beta$-ethylenically unsaturated carboxylic acid copolymers.

The copolymers employed to form ionic copolymers which are useful as plastics are preferably high molecular weight in order to achieve the outstanding solid state properties which can be obtained through the use of this invention. Although the mechanical properties of low molecular weight copolymers are improved by the process of the present invention, the product does not exhibit such mechanical properties as are obtained when using high molecular weight copolymers. The molecular weight of the copolymers useful in the present invention is most suitably defined by inherent viscosity. The inherent viscosity of copolymers employed in the formation of ionic copolymers which are useful as plastics is preferably above 0.7 as determined from a 0.5 percent solution of the polymer in dimethylformamide at 20° C.

The base copolymers used need not necessarily consist of two components. Thus, more than one of the major constituent comonomers above-described may be used.

The scope of the copolymers suitable for use as the copolymer in the present invention is illustrated by the following examples: methyl methacrylate/methacrylic acid copolymers, styrene/acrylic acid copolymers, vinylidene chloride/acrylic acid copolymers, vinyl acetate/itaconic acid copolymers, N-butyl acrylamide/acrylic acid copolymers, methyl vinyl ether/fumaric acid copolymers, acrylonitrile/acrylic acid copolymers, vinyl chloride/methyl hydrogen itaconate copolymers, 1 - methyl styrene/methacrylic acid graft copolymers, ethyl methacrylate/methacrylic acid copolymers, methacrylamide/methacrylic acid copolymers, methacrylonitrile/methacrylic acid copolymers, styrene/p-styrene sulfonic acid copolymers, and styrene/p-styrene carboxylic acid copolymers.

The change in properties resulting from linking is proportional to the degree of linking and, therefore, to the number of links and the nature of the links involved. Although an improvement in solid state properties is obtained with even a small percentage of the acid groups neutralized by reaction with the diamine, in general, a noticeable improvement is observed only after the linking equals 0.2 mole percent based on the monomer units of total polymer and at least 10 percent of the carboxylic acid groups are neutralized. In order to obtain optimum solid state properties it is preferred to have less than 25 mole percent, based on the monomer units in the polymer, of acid groups in the polymer. The links formed appear not to be cross-links between polymer chains but rather are links along one polymer chain. The links are ionic in nature and result in the formation of a salt rather than an amide. Thus, the linked acid groups have the structure —COO⁻ and the amino groups, the structure —NH₃+. The problem of forming amide links is not encountered unless dehydrating conditions are employed in mixing the diamine with the copolymer. Therefore, rather than obtaining an intractable or thermosetting polymer, a thermoplastic polymer which has an enhanced yield strength and considerable elongation is obtained on linking. This, of course, not only depends on the degree of neutralization but also on the number of linking sites, and the molecular weight of the base copolymer. In general, it was found that base copolymers having molecular weights, such that they exhibit a melt index of from 1 to 10 g./10 minutes (ASTM method D–1238–57T) and an $\alpha,\beta$-ethylenically unsaturated carboxylic acid concentration of 1 to 10 mole percent show optimum properties upon 30 to 80 percent neutralization. The degree of neutralization can be decreased as the molecular weight of the copolymer is increased without significantly changing the properties of the copolymer.

The diamines used in this invention are aliphatic or cycloaliphatic diamines in which there are from 1 to 10 carbon atoms between the two amine groups and there are less than 20 carbon atoms in the diamine molecule.

The quantity of diamine employed or the degree of neutralization of the acid groups in the blend will differ with the degree of solid property change, and degree of melt property change desired for a particular application. In general, it was found that the concentration of diamine should be sufficient to react with or neutralize at least 10 percent of the carboxylic acid groups in order to give a significant improvement in properties. As explained above, the degree of neutralization for optimum properties will vary with the acid concentration and molecular weight of the copolymer. However, it is generally desirable to neutralize at least 30 to 80 percent of the acid groups. The degree of neutralization may be measured by several techniques. Thus, infrared analysis may be employed and the degree of neutralization calculated from the changes resulting in the absorption bands. Small excess quantities of diamine are necessary to carry the neutralization to completion. Large excess quantities of diamine are to be avoided since they do not improve the properties of the blend, and on the contrary, may have a detrimental effect on said blend. It is preferred to not carry the neutralization above 90 percent of completion.

As can be seen from the following examples, the ultimate elongation of the linked copolymer is greater than the ultimate elongation of the unlinked copolymer.

The following examples are illustrative of the invention.

EXAMPLE I

A copolymer containing 18 weight percent methacrylic acid and 82 weight percent methyl methacrylate is prepared by suspension polymerization. A 50 g. sample is milled for 15 minutes at 180° C. with 3 g. hexamethylene diamine and another 50 g. sample with 7 g. hexamethylene diamine under the same condition. The 7 g. hexamethylene diamine represent a molar excess and the excess diamine is volatilized from the product. The products are clear polymers, which are compression molded into test specimens at 225° C. Tensile tests are run at 0.02" per minute on compression-molded samples to give the results reported in Table I. The heat distortion temperatures are measured by clamping 5.25 in. by 0.5 in. by 125 mil compression molded bars horizontally at one end in an air oven and the temperature raised by 5° C. increments every 30 minutes. The temperature at which the free end sagged 1 cm. from its original position is taken as the oven sag temperature.

TABLE I

| Sample | Ultimate Tensile Strength (P.s.i.) | Elongation at Break, Percent | Heat Distortion Temperature, ° C. |
| --- | --- | --- | --- |
| Copolymer | 3,640 | 3 | 111.2 |
| Copolymer plus 6% diamine | 5,580 | 7 | 119.5 |
| Copolymer plus 14% diamine | 7,360 | 8 | 118.0 |

EXAMPLE II

A copolymer containing 10 weight percent methacrylic acid and 90 weight percent styrene is prepared by solution polymerization. Twenty-five gs. of this copolymer, dissolved in 200 cc. of benzene, reacted with 1.5 g. of hexamethylene diamine at 80° C. for 5 minutes. The product was stiff and transparent like the base resin. Elongation, measured at 0.2 inch per minute is 7 percent, compared with less than 1 percent for the starting material, indicating that toughness of the polymer is much improved by treatment with diamines. Other tensile properties are essentially unchanged.

EXAMPLE III

A mixture, consisting of 200 cc. water, 100 cc. styrene, 2 gs. sodium styrene sulfonate, 1 g. of tetrasodium-N-(1,2-dicarboxyl)-N-octadecyl sulfosuccinamiate, and 0.2 g. of potassium persulfate, is stirred under reflux for 5 hours. The product is a stable latex, from which the polymer is recovered by evaporation, followed by chopping up and washing with water. The entire product is converted to

TABLE II

| Ex. | Copolymer | Properties of Base Copolymer | | | Diamine | | Properties of Linked Copolymer | | |
| --- | --- | --- | --- | --- | --- | --- | --- | --- | --- |
| | | Stiffness (P.s.i.) | Yield Strength (P.s.i.) | Elongation, Percent | Material | Wt. Percent Based on Copolymer | Stiffness (P.s.i.) | Yield Strength (P.s.i.) | Elongation, Percent |
| 3 | Styrene/styrene sulfonic acid | 406,000 | 4,175 | 7.3 | Decamethylene | 10 | 395,000 | 6,800 | 11.0 |
| 4 | Styrene/maleic acid 90/10 | 280,000 | 4,900 | 4 | Hexamethylene diamine | 10 | 300,000 | 7,100 | 8.0 |
| 5 | Vinyl chloride/acrylic acid 92/8 | 405,000 | 3,300 | 3.5 | do | 12 | 460,000 | 5,200 | 5.6 |
| 6 | Acrylonitrile/acrylic acid 90/10 | 436,000 | 5,100 | 4.3 | Bis(p-amino cyclohexyl) methane | 15 | 550,000 | 8,100 | 8.3 |
| 7 | Styrene/acrylonitrile/acrylic acid 40/50/10 | 510,000 | 5,800 | 5.3 | N,N diisopropyl hexamethylene diamine | 15 | 620,000 | 7,000 | 7.2 |
| 8 | Vinyl acetate/methacrylic acid 90/10 | 410,000 | 3,800 | 8 | Hexamethylene diamine | 10 | 580,000 | 5,200 | 12 |
| 9 | Methyl acrylate/acrylic acid 90/10 | 28,000 | 1,650 | 300 | do | 10 | 30,000 | 4,300 | 35.0 |
| 10 | Methyl vinyl ether/itaconic acid | 20,000 | 1,200 | 25 | do | 10 | 25,000 | 2,200 | 35 |
| 11 | Methyl vinyl ketone/β-cyano acrylic acid | 140,000 | 5,800 | 12 | do | 10 | 150,000 | 7,100 | 18.0 |
| 12 | Vinylidene chloride/acrylic acid | 380,000 | 4,200 | 5.0 | Decamethylene diamine | 10 | 460,000 | 5,800 | 10.0 |
| 13 | Methacrylonitrile/methacrylic acid | 330,000 | 3,000 | 3.8 | Hexamethylene diamine | 10 | 410,000 | 5,100 | 6.2 | the free acid by dissolving in acid and treatment with methanolic HCl. Twenty-five gs. of this free acid product is dissolved in 250 cc. of benzene at 70° C. and 2.5 gs. of decamethylene diamine dissolved in water is added. The product is recovered by evaporation of the benzene followed by washing with methanol.

The test values reported in Table II were obtained by the same procedures described in Example I.

EXAMPLE XIV

The linked copolymer of Example I is extruded at 200° C. to form a 1 mil film using a conventional extruder equipped with a tubular die. The extruded film is transparent, tough, and well adapted for numerous packaging applications. This cross-linked blend is also extruded through a spinerette having 15 mil diameter openings at 220° C. and drawn 1.5 X to give fibers of high tenacity.

The linked copolymer of Example II is well adapted to fabrication by injection molding. Gears, coil forms, and bottle screw caps are injection molded, using a conventional injection molding machine with the cylinder at 250° C. The molded parts are transparent, stiff and tough.

The linked polymer of Example III is used to make 4 oz. bottles. Parisons are extruded at 230° C. through a crosshead die and then blown into the final form in a cooled mold cavity. The bottles are stiff, transparent, and tough.

Tough, resilient, 1 inch I.D. and 1.25 inch O.D. pipe is extruded from the linked copolymer of Example I using a crosshead die fitted to a conventional 2 inch extruder, using a barrel temperature of 210° C.

The linked blends of this invention may be modified, if desired, by addition of antioxidants, stabilizers, fillers or other additives which do not interfere with the links or diamines. Generally, however, additives do not interfere with the diamines used in this invention.

The high molecular weight linked polymers of the present invention can be extruded into films of excellent clarity, fibers of outstanding elasticity and resilience, pipes with superior stress-crack resistance, wire coatings with improved cut-through resistance, and foamed sheets; they further can be injection molded into intricate shapes and closely retain the dimension of the mold; they can readily be vacuum formed, blow-molded, and compression molded. Surfaces of the linked polymers are printable and adhere well to adhesives commercially available. Thus, they can be laminated to paper, metal foil, and surfaces of other plastics. Many other uses and modifications of the linked copolymers of the present invention will be apparent from the foregoing description and it is not intended to exclude such from the scope of this invention.

I claim:

1. A thermoplastic copolymer consisting essentially of from 0.2 to 25 mole percent based on the polymer of an α,β-ethylenically unsaturated acid monomer selected from the class consisting of α,β-ethylenically unsaturated mono and dicarboxylic acids containing from 3 to 10 carbon atoms, and styrene sulfonic acid, and the remainder predominant monomer units having the structure $CH_2=CHR_1$, wherein $R_1$ is selected from the group consisting of aromatic radicals, ester radicals, amide radicals, acyloxy radicals, alkoxy radicals, halogens, acyl radicals, and nitriles, and monomer units having the structure

wherein $R_2$ is selected from the group consisting of halogens and methyl, and $R_3$ is selected from the group consisting of halogens, the phenyl radical, ester radicals, amide radicals and nitriles, which copolymer is ionically linked with a diamine having an alkyl chain of from 1 to 10 carbon atoms separating the amine groups, and containing less than 20 total carbon atoms, said diamine being present in an amount of from 0.2 mole percent up to a stoichiometric equivalent based on the acid groups present and wherein from 10 to 90 percent of the acid groups are ionized to form a salt with the diamine.

2. The copolymer of claim 1 wherein from 1 to 10 mole percent based on the polymer is α,β-ethylenically unsaturated acid monomer and from 30 to 80 percent of the acid groups are ionized to form a salt with the diamine.

3. The composition of claim 2 wherein the diamine is hexamethylene diamine.

4. The composition of claim 2 wherein the predominant monomer is methyl methacrylate.

5. The composition of claim 2 wherein the predominent monomer is styrene.

6. The composition of claim 4 wherein the α,β-ethylenically unsaturated acid is methacrylic acid.

7. The composition of claim 5 wherein the α,β-ethylenically unsaturated acid is methacrylic acid.

8. The composition of claim 4 wherein the diamine is hexamethylene diamine.

9. The composition of claim 5 wherein the diamine is hexamethylene diamine.

10. The composition of claim 6 wherein the diamine is hexamethylene diamine.

11. The composition of claim 7 wherein the diamine is hexamethylene diamine.

References Cited

UNITED STATES PATENTS

| | | | |
|---|---|---|---|
| 2,754,280 | 7/1956 | Brown et al. | 260—78.5 |
| 2,783,212 | 2/1957 | Schnell | 260—86.1 |
| 2,988,539 | 6/1961 | Cohen et al. | 260—78.5 |

JOSEPH L. SCHOFER, *Primary Examiner.*

D. K. DENENBERG, *Assistant Examiner.*